Patented June 1, 1937

2,082,495

UNITED STATES PATENT OFFICE 2,082,495

AZO DYESTUFFS

Karl Holzach and Bernd v. Bock, Ludwigshafen-on-the-Rhine, Germany, assignors to General Aniline Works, Inc., New York, N. Y., a corporation of Delaware No Drawing. Application February 3, 1936, Serial No. 62,168. In Germany February 22, 1935

5 Claims. (Cl. 260—97)

The present invention relates to new azo dyestuffs.

A process for the manufacture and production of new azo dyestuffs is described in our copending application Ser. No. 9349, filed March 4th, 1935, according to which diazo compounds of ortho-aminophenols which are free from sulphonic or carboxylic acid groups and which contain one or more nitro groups of which one is in para-position to the amino group and containing, if desired, any further substituents are coupled with such N-hydroxyalkylated derivatives of meta-toluidine in which the nitrogen atom is a tertiary one, i. e. which bears a further hydroxyalkyl group or an alkyl group.

We have now found that especially valuable dyestuffs are obtained by coupling diazo compounds of 3-halogen - 5 - nitro - 2 - aminophenols with N-hydroxyalkylated derivatives of meta-toluidine in which the nitrogen atom is a tertiary one, i. e. which bears a further hydroxyalkyl group or an alkyl group.

The dyestuffs obtainable according to this invention are eminently suitable for dyeing cellulose esters and ethers. They yield valuable bluish dyeings thereon which are of a purity and clarity which have never hitherto been obtained in the corresponding shades of color. The dyeings have good fastness to light and washing and are capable of being discharged to give a pure white color. The dyestuffs may also be used for coloring resin and nitrocellulose lacquers.

The following example will further illustrate how this invention may be carried out in practice, but the invention is not restricted to this example. The parts are by weight.

Example 300 parts of a 23 per cent solution of sodium nitrite are added to a solution of 233 parts of 3-brom -5- nitro -2- aminophenol (obtainable by treating a suspension of 5-nitro-2-aminophenol in glacial acetic acid with the calculated amount of bromine at about 15° C.) in a mixture of 120 parts of 35 per cent caustic soda solution and 5000 parts of water and the mixture is poured into 800 parts of 18 per cent hydrochloric acid. The reddish yellow suspension of the diazo compound thus obtained is then added to a solution of 210 parts of N-di-hydroxyethyl-meta-toluidine in 240 parts of 18 per cent hydrochloric acid and 2000 parts of water. The coupling is completed by the addition of 600 parts of sodium acetate. The dyestuff is then filtered off by suction and washed. It yields on acetate artificial silk brilliant red-violet dyeings which have a good fastness to light and are capable of being discharged in pure white shades.

A very similar dyestuff is obtained by using the diazo compound of 3-chlor-5-nitro-2-aminophenol.

If 220 parts of N-hydroxyethyl-N-butyl-meta-toluidine be employed instead of N-di-hydroxyethyl-meta-toluidine, a dyestuff is obtained which yields blue-violet dyeings having similar very good properties on acetate artificial silk.

What we claim is:

1. Azo dyestuffs produced by coupling the diazo compound of a 3-halogen-5-nitro-2-aminophenol with an N-hydroxylalkylated derivative of meta-toluidine in which the nitrogen atom is a tertiary one.

2. Azo dyestuffs produced by coupling the diazo compound of a 3-halogen-5-nitro-2-aminophenol with an N-di-hydroxyalkylated derivative of meta-toluidine.

3. Azo dyestuffs corresponding to the formula

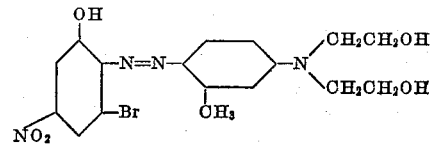

4. Azo dyestuffs produced by coupling the diazo compound of a 3-halogen-5-nitro-2-amino-phenol with an N-hydroxyalkylated-N-alkylated derivative of meta-toluidine.

5. Azo dyestuff corresponding to the formula

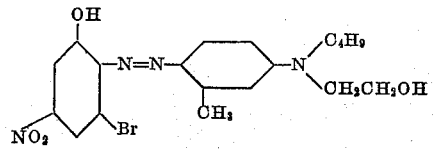

KARL HOLZACH.
BERND V. BOCK.